(12) United States Patent
Canlas et al.

(10) Patent No.: US 6,181,509 B1
(45) Date of Patent: Jan. 30, 2001

(54) LOW SULFUR OUTGASSING FREE MACHINING STAINLESS STEEL DISK DRIVE COMPONENTS

(75) Inventors: Eduardo Gatmaitan Canlas; Andrew Keith Hanlon, both of San Jose; Brad Vaughn Johnson, Santa Clara; Keith Freeman Wood; Deborah L. Yaney, both of Sunnyvale, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/298,391

(22) Filed: Apr. 23, 1999

(51) Int. Cl.[7] .............................. G11B 5/012; G11B 33/14
(52) U.S. Cl. ................................ 360/97.01; 360/99.08; 360/264.1
(58) Field of Search ..................... 360/97.01, 99.08, 360/98.07, 264.1, 264.3, 265.7

(56) References Cited

U.S. PATENT DOCUMENTS

| | | | |
|---|---|---|---|
| 3,933,480 | 1/1976 | Tipnis | 75/129 |
| 4,945,432 | 7/1990 | Matsudaira et al. | 360/98.02 |
| 5,278,709 | 1/1994 | Thornton et al. | 360/97.01 |
| 5,430,590 | 7/1995 | Ainslie et al. | 360/98.07 |
| 5,459,628 | 10/1995 | Brooks | 360/99.08 |
| 5,707,586 | 1/1998 | McMann | 420/42 |
| 5,844,151 | 12/1998 | Brown et al. | 73/866 |

FOREIGN PATENT DOCUMENTS 11-162100 * 6/1999 (JP).
12-03585 * 1/2000 (JP).

OTHER PUBLICATIONS

Aerospace Structural Metals Handbook, 1997 Ed., code 1401, pp. 1–4.
Materials Engineering Magazine, Dec. 1987, p. 47.
Slater Steels Corp., Stainless Type 430F information pages, 1998.

* cited by examiner

Primary Examiner—Jefferson Evans
(74) Attorney, Agent, or Firm—Alan S. Raynes; Konrad Raynes & Victor

(57) ABSTRACT

Embodiments include a disk drive having a drive motor assembly including at least one component selected from the group consisting of a rotatable hub, disk spacer, disk clamp, backiron, lower bearing bushing, and lower mounting flange. At least one of the components comprises a low sulfur outgassing free machining stainless steel material. The low sulfur outgassing free machining stainless steel material may include a free machining stainless steel that outgases sulfur at a rate insufficient to cause visually observable sulfide corrosion when tested by placing a copper strip into contact with the free machining stainless steel in an environment having a temperature of 50° C. and 90% relative humidity for a 7 day test period and then observing the copper strip.

22 Claims, 5 Drawing Sheets

LOW SULFUR OUTGASSING FREE MACHINING STAINLESS STEEL DISK DRIVE COMPONENTS

FIELD OF THE INVENTION

Embodiments of the present invention relate generally to disk drive systems and to components within the disk drive systems.

DESCRIPTION OF RELATED ART

Magnetic storage systems are information storage devices which utilize at least one rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The disks are separated by spacers. The system also includes a head actuator for moving the magnetic recording head relative to the disk surfaces, and a printed circuit board (PCB) with electronic circuitry for processing signals to implement various functions of the disk drive.

One failure mechanism for disk drive systems relates to failure of the magnetic disks. In order to achieve a large recording density, magnetic disks are typically made from non metallic substrate materials such as glass and ceramic. However, glass and ceramic disks are brittle and can easily break when subjected to stress. As a result, it is conventional in the art to choose the components in the disk drive system to minimize stresses caused by thermal expansion mismatch between adjoining components. This has been accomplished by fabricating the parts such as the hub and spacers from materials having similar coefficients of thermal expansion to the materials the disks are fabricated from.

In addition to failure of the disks, matching the coefficients of thermal expansion is important to minimize the occurrence of thermal track shift. Thermal track shift is caused by thermal expansion mismatch between the disks and parts in contact with the disks, which causes the disks to shift radially. The radial shift leads to eccentric data tracks, which are more difficult for the actuator to accurately follow. In addition, different disks in the disk stack may have different levels of thermal track shift. These problems are minimized by using materials having similar coefficients of thermal expansion.

Metals such as conventional steels have been used for structural components in the disk drive. Stainless steels offer the additional benefit of better corrosion resistance. However, conventional stainless steels are difficult to machine to the fine tolerances necessary for disk drive components and are therefore expensive. Certain types of stainless steels are known as free machining stainless steels. Free machining stainless steels have similar properties to regular stainless steels, but are easier to machine due to their microstructure. In particular, free machining stainless steels include additional elements including sulfur, which is beneficial to machining. The sulfur forms sulfur-rich inclusions, such as manganese sulfide, which benefit machinability by lowering the shear strength of the metal chips formed during machining, which increases the machining efficiency. A free machining stainless steel which has been used for disk drive components is known under the AISI designation 430F, and includes approximately three tenths of one percent sulfur.

It has been observed, however, that when using free machining stainless steel for disk drive components, a certain amount of disk drive failures still occur. It would be desirable to reduce the number of such failures.

SUMMARY

It is an object of certain embodiments of the present invention to inhibit corrosion of disk drive wiring lines when utilizing free machining stainless steels for certain components in the drive assembly.

These and other objectives may be carried out in one embodiment by providing a disk drive including a drive motor assembly including at least one component selected from the group consisting of a rotatable hub, disk spacer, disk clamp, lower bearing bushing, and lower mounting flange. At least one of the components comprises a low sulfur outgassing free machining stainless steel material.

The low sulfur outgassing free machining stainless steel material may be a free machining stainless steel that outgases sulfur at a rate insufficient to cause visually observable (without magnification) sulfide corrosion when tested by placing a copper strip into contact with the free machining stainless steel in an environment having a temperature of 50° C. and 90% relative humidity for a 7 day test period and then observing the copper strip.

Embodiments may also include a head arm assembly including thin film heads for accessing data tracks on a disk. The head arm assembly includes wiring lines for transmitting electrical signals. A voice coil motor assembly may also be included to control the head arm assembly. The voice coil motor assembly preferably includes at least one spacer post comprising the low sulfur outgassing free machining stainless steel material.

Other embodiments relates to a disk drive including a drive motor assembly including at least one component selected from the group consisting of a rotatable hub, disk spacer, disk clamp, backiron, lower bearing bushing, and lower mounting flange. At least one of the components comprises a free machining stainless steel including manganese and sulfur in a ratio of no greater than 2 to 1.

Other embodiments relate to a disk drive including a drive motor assembly including at least one component selected from the group consisting of a rotatable hub, disk spacer, disk clamp, backiron lower bearing bushing, and lower mounting flange. At least one of the components comprises a free machining stainless steel including chromium and manganese, wherein the chromium to manganese ratio is at least 30 to 1.

Yet other embodiments relate to a spindle motor assembly for use in a magnetic recording device. The spindle motor assembly includes a shaft and a spindle hub. The spindle hub comprises a free machining stainless steel including manganese and sulfur in a ratio of no greater than 2 to 1.

Still other embodiments relate to a magnetic disk drive for reading and writing magnetically, including a plurality of magnetic disks and a plurality of magnetic read/write heads, each head being associated with the surface of a disk. The disk drive also includes an actuator for supporting the heads and moving the heads across the disks. A drive motor including a rotatable hub for mounting the disks, a disk spacer separating the disks, a disk clamp disposed above the disks and a lower bearing bushing below the disks is also included. At least one of the hub, disk spacer, disk clamp or lower bearing bushing comprises a low sulfur outgassing free machining stainless steel.

BRIEF DESCRIPTION OF THE DRAWINGS

Embodiments of the invention are described with reference to the accompanying drawings which, for illustrative purposes, are schematic and not necessarily drawn to scale.

DETAILED DESCRIPTION

Preferred embodiments of the present invention are described with reference to the Figures, in which like numbers represent the same or similar elements in FIGS. 1–3. While this invention is described in terms of the best mode for achieving this invention's objectives, it will be appreciated by those skilled in the art that variations may be accomplished in view of these teachings without deviating from the spirit or scope of the invention.

Figure 1:
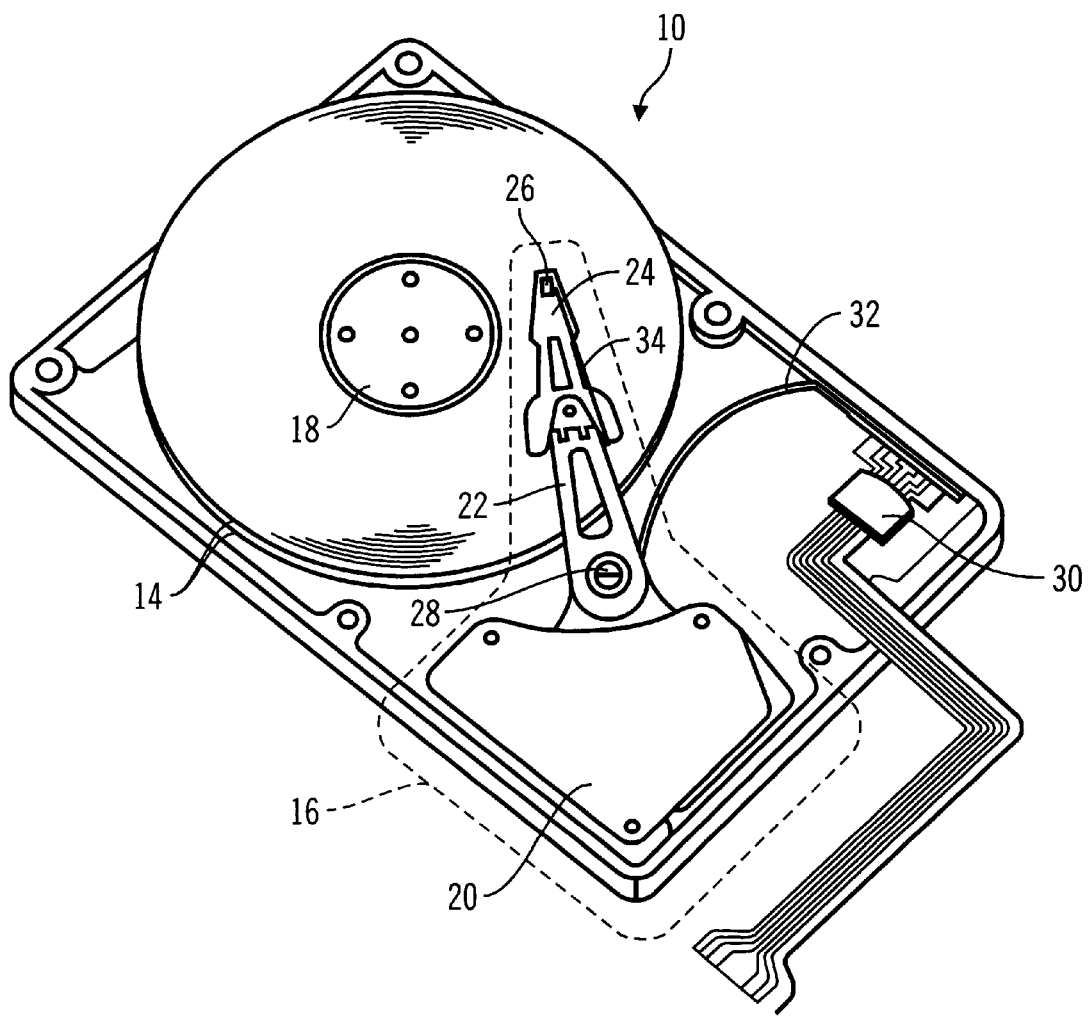
FIG. 1 is an illustration of components in a disk drive system according to certain embodiments of the present invention.

FIG. 1 illustrates portions of a disk drive system 10 according to certain embodiments of the present invention. The system includes one or more magnetic disks 14 stacked above one another. The disks 14 may be conventional particulate or thin film recording disks, which are capable of storing digital data in concentric tracks. Both sides of the disks 14 may be available for storage, and the stack may include any number of such disks 14. The disks 14 are mounted to a spindle 18. The spindle 18 is attached to a spindle motor, which rotates the spindle 18 and the disks 14 to provide read/write access to the various portions of the concentric tracks on the disks.

The disk drive system 10 also includes an actuator assembly 16 including voice coil motor assembly 20, which controls a head arm assembly which may include a positioner arm 22 and a suspension assembly 24. The suspension assembly 24 includes a read/write head 26 at its distal end. Although only one read/write head 26 is shown, it will be recognized that the disk drive assembly 10 may include a read/write head for each side of each disk 14 included in the drive. The positioner arm 22 further includes a pivot 28 around which the positioner arm 22 moves.

The disk drive system 10 further includes read/write chip 30. As is well known in the art, the read/write chip 30 cooperates with the read/write heads 26 to read data from and write data to the disks 14. A flexible printed circuit member 32 carries digital signals between the chip 30 and the actuator assembly 16. One or more electrical conductors 34 are routed along the positioner arm 22 and suspension 24 to carry electrical signals to and from the read/write head 26. A separate flexible printed circuit member interfaces with the chip 34 and associated drive electronics. The electrical conductors may be fabricated from a conductive metal such as, for example, copper.

Figure 2:
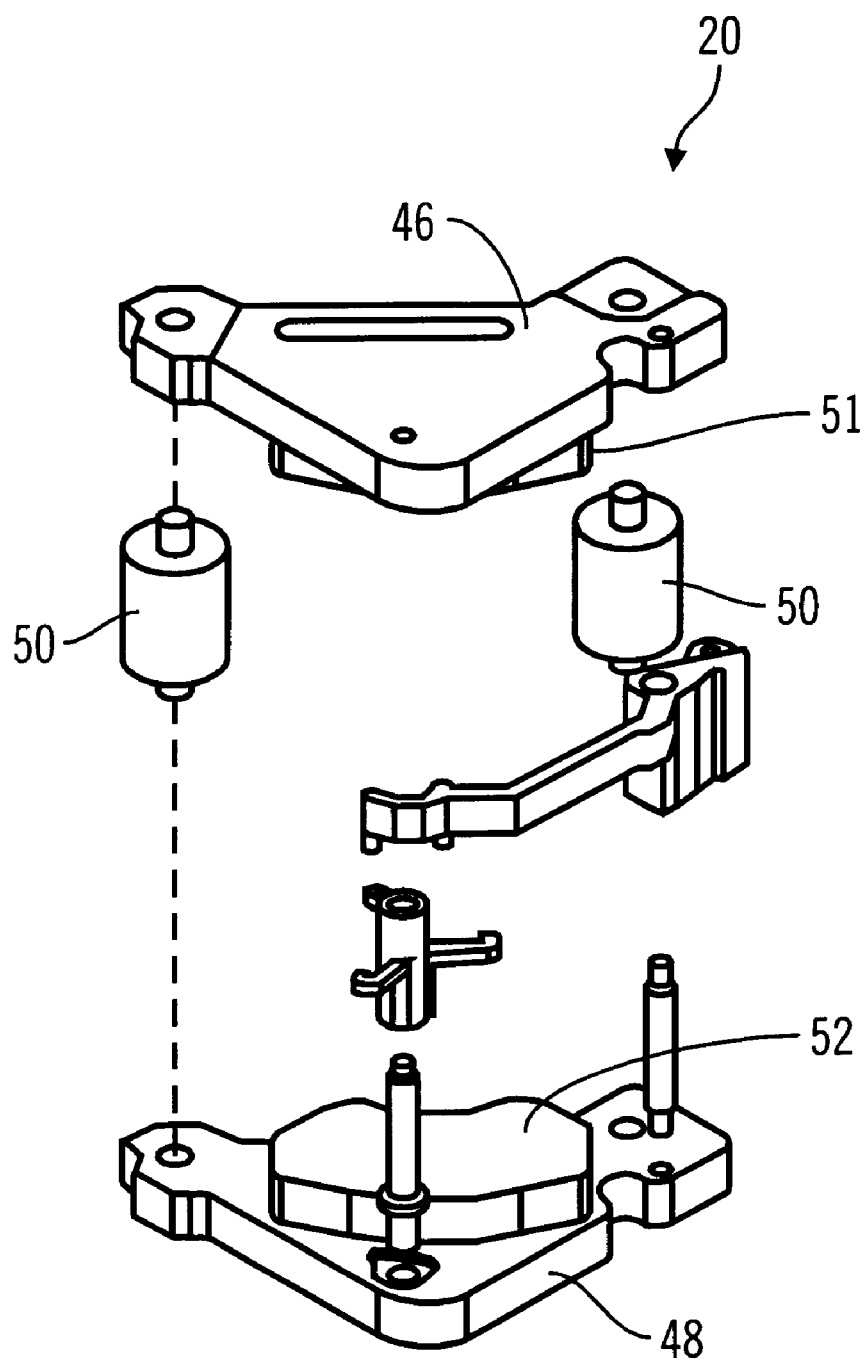
FIG. 2 is an illustration of certain components in a voice coil motor assembly according to embodiments of the present invention.

FIG. 2 illustrates a portion of a voice coil motor assembly 20 according to certain embodiments of the present invention. The assembly includes top and bottom pole pieces 46 and 48, and top and bottom magnets 51 and 52. Between the pole pieces 46, 48 there are spacer posts 50. Preferably the spacer posts 50 are fabricated from a material having a flux carrying capability. These components, together with a conductive coil, act to position the positioner arm 22 and ultimately, the read/write head 26 (shown in FIG. 1).

Figure 3:
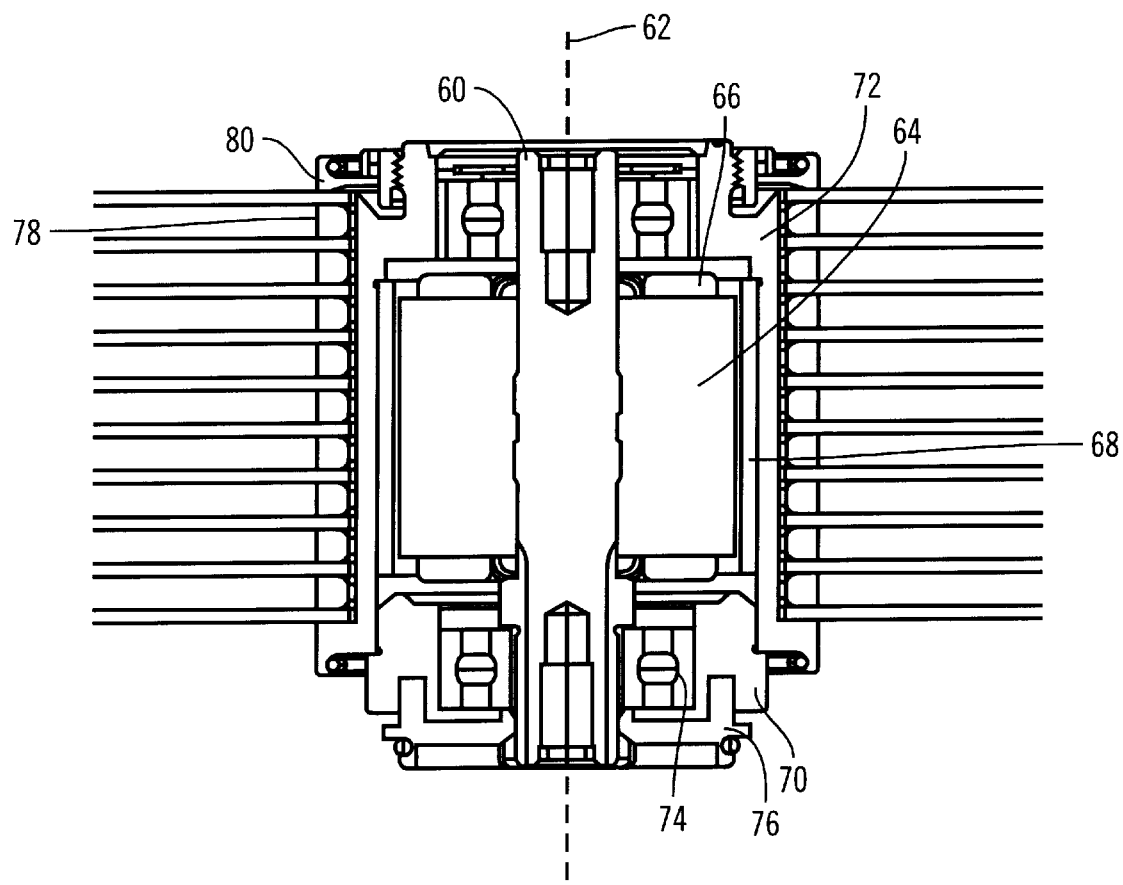
FIG. 3 is a cross-sectional view of a disk drive spindle motor according to embodiments of the present invention.

In order to better understand the structure of the spindle 18, reference is now made to FIG. 3, which illustrates an embodiment of a spindle motor portion of a disk drive system having a stack of magnetic disks 14 mounted thereon. The assembly includes a shaft 60 extending along a disk drive motor axis 62. Shaft 60 is surrounded by stator core 64 and stator winding 66, which provides the driving electromagnetic field for interaction with the rotating spindle components, including field magnets 68, lower bearing bushing 70, and hub 72. The spindle components are rotatably mounted by means of precision bearings 74 about the shaft 60. The assembly also includes a lower mounting flange 76 which remains stationary.

The disks 14 are typically placed over the hub 72 with disk spacers 78 disposed between the disks 14 and an upper disk clamp (or load washer) 80 positioned above the topmost disk 14. The upper disk clamp 80 clamps the stack of disks 14 and spacers 78 to rigidly position the disks 14 relative to the hub 72.

Figure 4:
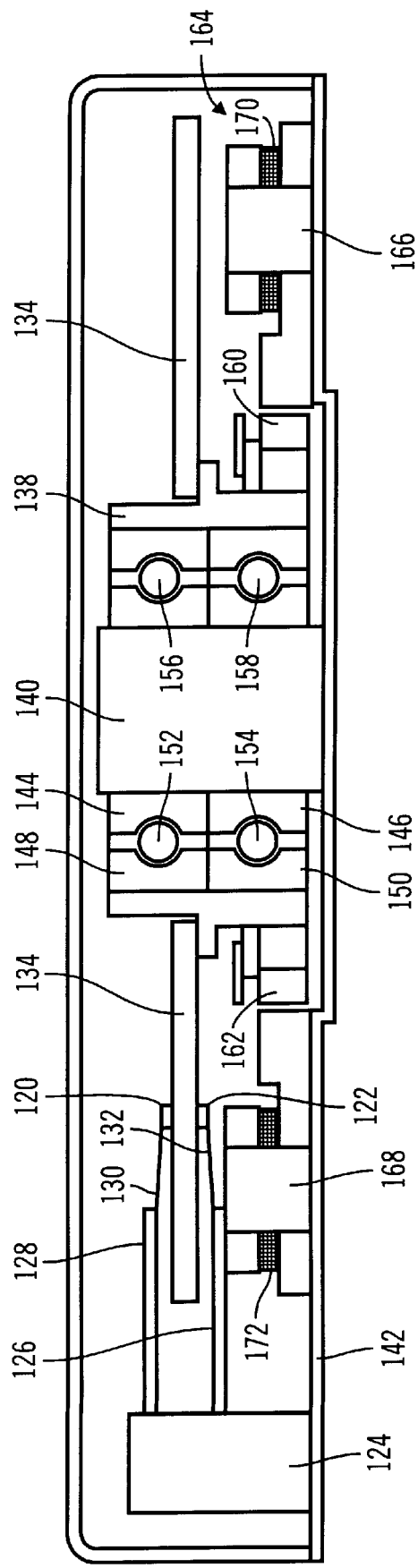
FIG. 4 is a cross-sectional view of a disk drive system according to certain embodiments of the present invention.

Another embodiment of a disk drive system is illustrated in FIG. 4. This system includes heads 120 and 122 connected to actuator assembly 124 by means of arms 126 and 128 and suspensions 130 and 132. Disk 134 is supported on hub or rotor 138, which is rotatably mounted on shaft 140. Shaft 140 is supported on housing 142. A plurality of permanent magnets (e.g. 160 and 162) as sections of an annular ring magnet are attached to hub 138. Stator 164 has a plurality of axial posts 166 and 168 and coils 170 and 172 disposed around the posts. Magnets 160 and 162 are preferably made of high moment magnetic material such as neodymium-iron-boron or samarium-cobalt. The annular ring magnet comprises a plurality of individual magnet sections with magnetic fields with alternatively point radially outwardly and inwardly around the ring. When an electrical current is applied to each coil of the stator, a magnetic field is induced which attracts or repels the permanent magnet sections to cause rotation of the hub.

An annular race is formed between hub 138 and shaft 140. Preferably the annular race comprises inner races 144 and 146 which are attached to and part of shaft 140 and outer races 148 and 150 which are attached to and part of hub 138. Ball bearings 152, 154, 156 and 158 are disposed in the annular race track formed by races 144, 146, 148 and 150.

Figure 5:
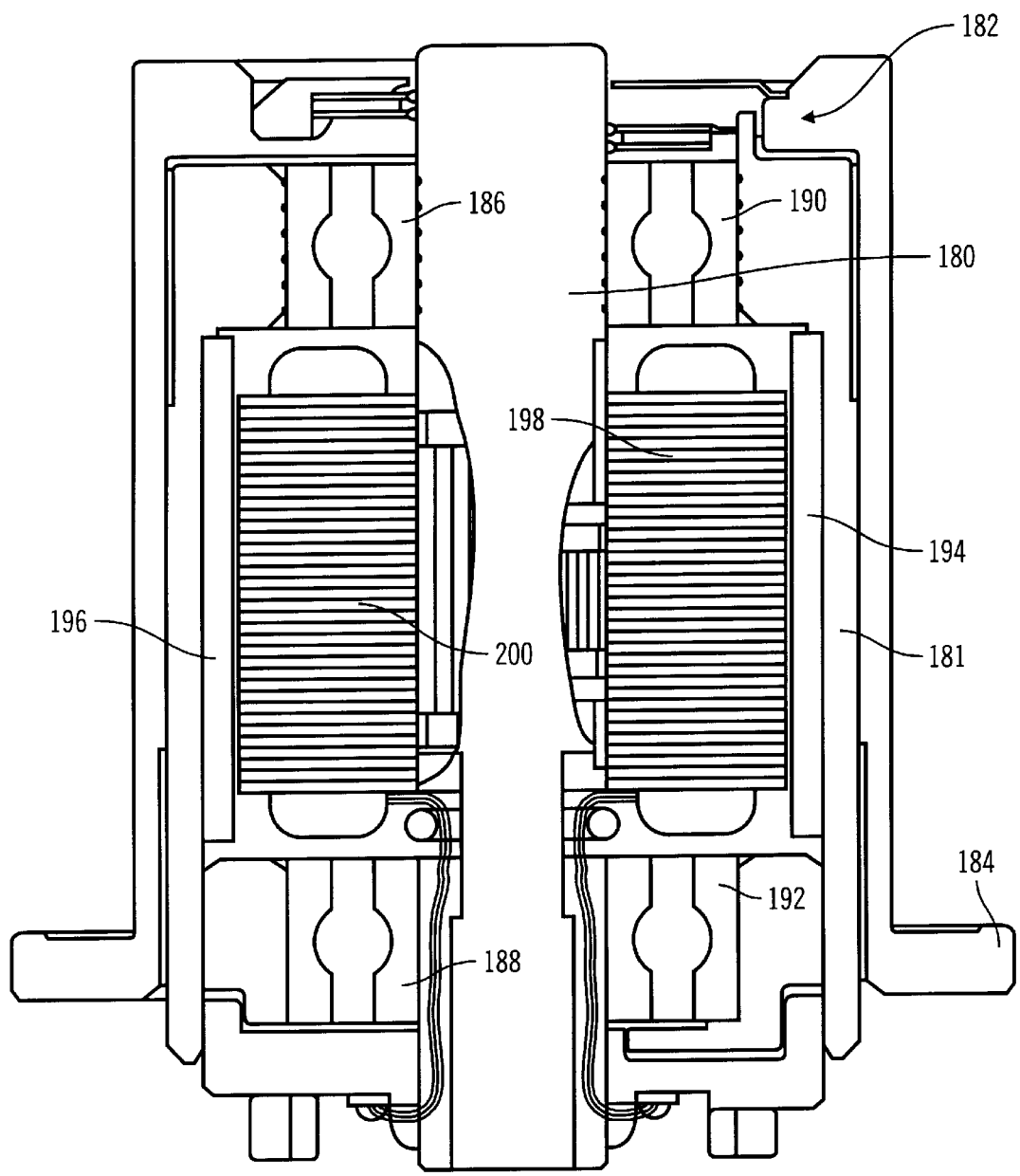
FIG. 5 is a cross-sectional view of a spindle motor according to certain embodiments of the present invention.

Referring to FIG. 5, there is shown an in-hub brushless DC spindle motor comprising shaft 180 and hub 182 having lip 184 for supporting a disk. The shaft has inner races 186 and 188 and hub has outer races 190 and 192. Permanent magnetic sections 194 and 196 are attached to hub 180. Coils 198 and 200 are attached to shaft 180. Other suitable spindle motors are known to those skilled in the art, such as disclosed in U.S. Pat. Nos: 5,502,605, 4,841,393, 5,448,119, and 5,296,981, the disclosures of which are incorporated herein by reference.

Fabricating certain disk drive components from 430F free machining stainless steel provides advantages including the ability to match the coefficient of thermal expansion to that of glass disks, to carry a magnetic flux, and for its resistance to corrosion. As used herein, free machining stainless steels include those stainless steels having enhanced machinability due to the presence of inclusions having sulfur therein and those referred to in various ASTM standards. It has been observed, however, that one mode of failure for disk drive systems having stainless steel components fabricated from 430F free machining stainless steel occurs at the electrical conductors 64 or other conducting lines in the disk drive system.

It is believed that these failures, when using a 430F free-machining stainless steel, are due to corrosion caused by sulfur outgassing from the stainless steel. Sulfur outgassing is believed to occur at temperatures such as those encountered in the disk drive assembly during use. In addition, it is believed that outgassing is enhanced at elevated humidities. When sufficient outgassing occurs, it is believed that electrical components such as the electrical conductors 64, which may be fabricated from a highly conductive metal such as copper, are attacked by the sulfur. The sulfur reacts with and corrodes the copper, thus deteriorating the electrical contact and causing at least partial device failure. In addition, corrosion products may accumulate and flake off or otherwise migrate to other surfaces in the disk drive system and lead to device failures. When copper lead lines are used, the corrosion products may include various copper sulfides (stoichiometric and non-stoiciometric) such as, for example, $Cu_2S$.

The present inventors have found that by utilizing certain types of free machining stainless steels, corrosion due to sulfur outgassing can be minimized or eliminated. In preferred embodiments, a free machining stainless steel which does not outgas sulfur in an amount sufficient to cause drive problems due to sulfur-induced corrosion is used.

In certain preferred embodiments, it is believed that by controlling the amount manganese and/or chromium in the free machining stainless steel, the amount of outgassing from the sulfur inclusions can be minimized to a level where failures from sulfur-induced corrosion of the conductors are minimized. The approximate quantities of additives in stainless steel type 430F versus compositions A, B, and C, which may be used in embodiments of the present invention, are shown in Table 1 below. (Compositions A and B are available under the designation DHS 1 and DHS2 from Daido Corp., and composition C is available under the designation QSF-190L by Sanyo Special Steel Co. Ltd.).

TABLE 1

Comparison of additive quantities in free machining stainless steels.

|  | Mn | S | Cr | Mn/S | Cr/Mn |
|---|---|---|---|---|---|
| 430F | 0.9 | 0.30 | 16 | 3.0 | 18 |
| A | 0.35 | 0.28 | 20 | 1.25 | 57 |
| B | 0.35 | 0.28 | 20 | 1.25 | 57 |
| C | 0.3 | 0.32 | 19 | 0.94 | 59 |

As seen in Table 1, the ratio of manganese to sulfur is substantially different for the 430F versus compositions A, B and C. Certain embodiments of the present invention preferably include components fabricated from a free machining stainless steel having a manganese to sulfur ratio of about 2 to 1 or less, even more preferably 1.5 to 1 or less, even more preferably about 1.25 or less.

It is believed that lowering the manganese content in the stainless steel composition alters the sulfur inclusions that are formed, making the inclusions more chromium rich instead of manganese rich. The test results indicate that outgassing is less of a problem with chromium rich inclusions than with manganese rich inclusions. As a result, the use of free machining stainless steel compositions having a high chromium to manganese ratio is also desirable. Table 1 indicates that the Cr/Mn ratio of the 430F stainless steel was about 18 to 1, whereas the ratio for the other 3 compositions was nearly 60 to 1. Components fabricated from free machining stainless steels according to certain embodiments of the present invention should preferably have a Cr/Mn ratio of about 30 to 1 and greater, more preferably about 40 to 1 and greater, even more preferably about 55 to 1 and greater. It is believed that these ratios will yield favorable results, with minimal corrosion occurring due to sulfur outgassing.

Tests were performed to determine the presence of corrosion product using a variety of materials. Test samples including various disk drive components were placed in contact with copper and silver witness foils and exposed to a 50° C. and 90% relative humidity environment for seven days. Copper and silver are examples of highly conductive metals that may be used as wiring lines in disk drive components. Each test sample was placed into a different chamber having the environment described above. Upon completion of the environment exposure, the copper and silver foils were examined for evidence of staining or corrosion. On certain samples staining or corrosion was visible (without magnification) on the test foils. Visible staining or corrosion observed on the samples may be associated with a sulfide presence due to sulfur corrosion. Confirmation of the staining or corrosion product was confirmed using a variety of techniques, such as, SEM-EDX and/or ESCA analysis. Table 1 describes the test results for three different materials subjected to the above described test procedure.

TABLE 2

Corrosion test studies.

| Disk Drive Component | Material | Cu foil | Ag foil |
|---|---|---|---|
| lower bushing/backiron | 430F | sulfide | sulfide |
| lower bushing/backiron | Ni plated carbon steel | no stain | no stain |
| hub | QSF-190L | no stain | no stain |

As seen in Table 2, various components including the lower bearing bushing, backiron, and hub were tested. As illustrated in FIG. 4, for example, certain disk drive motor embodiments include a backiron 181 between the hub 182 and magnet 160, 162. The results from Table 1 indicate that disk drive components fabricated from 430F free machining stainless steel showed a sulfur-induced corrosion product. Components fabricated from either nickel plated carbon steel or QSF-190L showed no visible corrosion product. Nickel plated carbon steels, however, have the disadvantage that they generally have a relatively large thermal expansion mismatch with the preferred disk materials. Thus, a low sulfur outgassing free machining stainless steel, such as the QSF-190L, which does not outgas sulfur at a rate sufficient to cause lead wire corrosion problems, is preferably used to fabricate various components in the disk drive system. In certain applications a preferred test for determining whether a material is a low sulfur outgassing free machining stainless steel includes determining whether the free machining stainless steel outgases sulfur at a rate insufficient to cause visually observable sulfide corrosion when tested by placing a copper strip into contact with the free machining stainless steel in an environment having a temperature of 50° C. and 90% relative humidity for a 7 day test period.

In certain preferred embodiments it is desirable to use a low sulfur outgassing free machining stainless steel for components which will be exposed within the disk drive system and those in which a closely matched thermal expansion coefficient to that of the disks is desired. As illustrated in the systems described above, for example, such components may preferably include one or more components such as, but not limited to, the hubs 72, 184, the lower bearing bushing 70, the lower mounting flange 76, disk spacers 78, disk clamp 80, the spacer posts 50, and backiron 181. By fabricating components from a low sulfur outgassing free machining stainless steel, wiring line corrosion problems are minimized.

It will, of course, be understood that modifications of the present invention, in its various aspects, will be apparent to those skilled in the art. Other embodiments are possible, their specific features depending upon the particular application. A variety of disk drive configurations, geometries, and components may be may be employed in disk drive systems in addition to those discussed above. For example, in addition to thin film heads for accessing data from disks, a variety of other types of heads, including, for example, magneto-restrictive (MR) and giant magneto-resistive (GMR), may also be used in certain embodiments to access data on disks. The scope of the invention should not be limited by the particular embodiments described herein.

What is claimed:

1. A disk drive comprising:
   a drive motor assembly, said assembly including at least one component selected from the group consisting of a rotatable hub, disk spacer, disk clamp, lower bearing bushing, and lower mounting flange;
   wherein at least one of said components comprises a low sulfur outgassing free machining stainless steel material.

2. A disk drive as in claim 1, further comprising a head arm assembly including thin film heads for accessing data tracks on a disk, said head arm assembly including wiring lines for transmitting electrical signals.

3. A disk drive as in claim 2, further comprising a voice coil motor assembly to control said head arm assembly, said voice coil motor assembly including at least one spacer post, wherein said spacer post comprises said low sulfur outgassing free machining stainless steel material.

4. A disk drive assembly as in claim 3, further comprising a plurality of disks, wherein said at least one component comprises:
   a rotatable hub disposed around a rotational axis, said disks disposed around said hub;
   at least one spacer separating said disks;
   a disk clamp disposed above said disks;
   wherein said hub, spacer and disk clamp are fabricated from said low sulfur outgassing free machining stainless steel material.

5. A disk drive as in claim 1, wherein at least one of said components comprises a free machining stainless steel including manganese, sulfur and chromium, said manganese to sulfur ratio being no greater than 2 to 1 and said chromium to manganese ratio being at least 30 to 1.

6. A disk drive as in claim 1, wherein said components are all fabricated from said low sulfur outgassing free machining steel.

7. A disk drive comprising:
   a drive motor assembly, said assembly including at least one component selected from the group consisting of a rotatable hub, disk spacer, disk clamp, backiron, lower bearing bushing, and lower mounting flange;
   wherein at least one of said components comprises a free machining stainless steel including manganese and sulfur in a ratio of no greater than 2 to 1.

8. A disk drive as in claim 7, wherein said ratio of manganese to sulfur is no greater than 1.5 to 1.

9. A disk drive as in claim 7, wherein said ratio of manganese to sulfur is no greater than 1.25 to 1.

10. A disk drive as in claim 7, further comprising:
    a head arm assembly including thin film heads for accessing data tracks on a disk, said head arm assembly including wiring lines for transmitting electrical signals; and
    a voice coil motor assembly to control said head arm assembly, said voice coil motor assembly including at least one spacer post, wherein said spacer post comprises said free machining stainless steel including manganese and sulfur in a ratio of no greater than 2 to 1.

11. A disk drive as in claim 7, wherein said free machining stainless steel includes:
    0.25 to 0.4 percent by weight manganese;
    0.25 to 0.35 percent by weight sulfur; and
    18 to 21 percent by weight chromium.

12. A disk drive as in claim 7, wherein at least three of said components comprise a free machining stainless steel including manganese and sulfur in a ratio of no greater than 2 to 1.

13. A disk drive comprising:
    a drive motor assembly, said assembly including at least one component selected from the group consisting of a rotatable hub, disk spacer, disk clamp, backiron, lower bearing bushing, and lower mounting flange;
    wherein at least one of said components comprises a free machining stainless steel including chromium and manganese, wherein said chromium to manganese ratio is at least 30 to 1.

14. A disk drive as in claim 13, wherein said chromium to manganese ratio is at least 40 to 1.

15. A disk drive as in claim 13, wherein said chromium to manganese ratio is at least 55 to 1.

16. A disk drive as in claim 13, wherein said free machining stainless steel further comprises sulfur and said manganese to sulfur ratio is no greater than 1.5 to 1.

17. A disk drive as in claim 13, further comprising:
    a head arm assembly including thin film heads for accessing data tracks on a disk, said head arm assembly including wiring lines for transmitting electrical signals; and
    a voice coil motor assembly to control said head arm assembly, said voice coil motor assembly including at least one spacer post, wherein said spacer post comprises said free machining stainless steel including chromium and manganese, wherein said chromium to manganese ratio is at least 30 to 1.

18. A spindle motor assembly for use in a magnetic recording device comprising:
    a shaft and a spindle hub, wherein said spindle hub comprises a free machining stainless steel including manganese and sulfur in a ratio of no greater than 2 to 1.

19. A spindle motor assembly as in claim 18, further comprising a lower bearing bushing and a lower mounting flange, wherein at least one of said lower bearing bushing and said lower mounting flange comprises a free machining stainless steel including manganese and sulfur in a ratio of no greater than 2 to 1.

20. A spindle motor assembly as in claim 18, further comprising a disk spacer and a disk clamp, wherein at least one of said disk spacer and disk clamp comprises a free machining stainless steel including manganese and sulfur in a ratio of no greater than 2 to 1.

21. A spindle motor assembly as in claim 18, wherein said free machining stainless steel also includes chromium and said chromium to manganese ratio is at least 40 to 1.

22. A magnetic disk drive for reading and writing magnetically comprising:

(a) a plurality of magnetic disks;
(b) a plurality of magnetic read/write heads, each associated with the surface of a disk;
(c) an actuator for supporting the heads and moving the heads across the disks;
(d) a drive motor including a rotatable hub for mounting the disks, a disk spacer separating the disks, a disk clamp disposed above the disks and a lower bearing bushing below the disks; wherein at least one of the hub, disk spacer, disk clamp or lower bearing bushing comprises a low sulfur outgassing free machining stainless steel.

* * * * *

UNITED STATES PATENT AND TRADEMARK OFFICE
CERTIFICATE OF CORRECTION

PATENT NO. : 6,181,509 B1 Page 1 of 1
APPLICATION NO. : 09/298391
DATED : January 30, 2001
INVENTOR(S) : E. Canlas et al.

It is certified that error appears in the above-identified patent and that said Letters Patent is hereby corrected as shown below:

On Title page, Item (75) Inventors, delete,
"Deborah L. Yaney, both of Sunnyvale", and insert -- Sunnyvale, --.

Signed and Sealed this

Thirtieth Day of January, 2007

JON W. DUDAS
*Director of the United States Patent and Trademark Office*